US012563497B2

(12) United States Patent
Chen et al.

(10) Patent No.: US 12,563,497 B2
(45) Date of Patent: Feb. 24, 2026

(54) METHOD AND APPARATUS FOR MANAGING SIGNAL TRANSMISSION POWER MODE

(71) Applicant: QUALCOMM Incorporated, San Diego, CA (US)

(72) Inventors: Siyi Chen, Beijing (CN); Jing Sun, San Diego, CA (US); Changlong Xu, Beijing (CN); Xiaoxia Zhang, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 549 days.

(21) Appl. No.: 17/997,124

(22) PCT Filed: Jun. 18, 2020

(86) PCT No.: PCT/CN2020/096838
§ 371 (c)(1),
(2) Date: Oct. 25, 2022

(87) PCT Pub. No.: WO2021/253328
PCT Pub. Date: Dec. 23, 2021

(65) Prior Publication Data
US 2023/0232329 A1      Jul. 20, 2023

(51) Int. Cl.
*H04W 4/33* (2018.01)
*H04W 24/10* (2009.01)
*H04W 52/02* (2009.01)

(52) U.S. Cl.
CPC ......... *H04W 52/0235* (2013.01); *H04W 4/33* (2018.02); *H04W 24/10* (2013.01); *H04W 52/0241* (2013.01)

(58) Field of Classification Search
CPC ............... H04W 56/005; H04W 56/00; H04W 72/1268; H04W 74/0833; H04W 74/0841;
(Continued)

(56) References Cited

U.S. PATENT DOCUMENTS 10,397,864 B2    8/2019  Sambhwani et al.
10,405,278 B2    9/2019  Ang et al.
(Continued)

FOREIGN PATENT DOCUMENTS

CN        104854927 A     8/2015
WO        2016070004      5/2016
(Continued)

OTHER PUBLICATIONS

International Search Report and Written Opinion—PCT/CN2020/096838—ISA/EPO—Mar. 3, 2021.

*Primary Examiner* — Nathan S Taylor
(74) *Attorney, Agent, or Firm* — ArentFox Schiff, LLP

(57)          ABSTRACT
The apparatus of wireless communication is a UE. The UE out of coverage of any base station may operate in a VLP mode and set a signal transmission power to a first power level. The UE may detect and connect to a base station, switch the power mode of UE based on a power mode of the base station connected by the UE, and switch the signal transmission power from the first power level to the second power level greater than the first power level. When the UE detects equal to or more than two base stations, the UE may select the base station from the equal to or more than two base stations detected based on a condition and connect to the base station selected from the two detected base stations.

22 Claims, 9 Drawing Sheets

FIG. 9

(58) Field of Classification Search
CPC . H04W 74/0866; H04W 74/08; H04W 72/12; H04W 4/06; H04W 76/40; H04W 64/00; H04W 52/0229; H04W 52/0235; H04W 68/025; H04W 76/28; H04W 24/10; H04W 52/0206; H04W 52/0216; H04W 52/0232; H04W 64/006; H04W 8/24; H04W 52/02; G01S 13/003; G01S 13/765; G01S 13/767; G01S 13/87; G01S 13/00; G01S 13/76; G01S 5/02; H04L 43/0864; H04L 1/0003; H04L 1/0009; H04L 1/0026; H04L 1/1816; H04L 1/1822; H04L 1/1861; H04L 12/1868; H04L 2001/0093; H04L 5/0055; H04L 1/18; H04L 5/00; H04L 5/0048; H04L 5/0053
See application file for complete search history.

(56) References Cited

U.S. PATENT DOCUMENTS

| 12,232,052 B2 * | 2/2025 | Takahashi | H04W 72/0473 |
| 2018/0014251 A1 * | 1/2018 | Sambhwani | H04W 52/0212 |

| 2019/0342836 A1 * | 11/2019 | Ang | H04W 72/0446 |
| 2019/0364500 A1 * | 11/2019 | Sambhwani | H04W 52/0216 |
| 2020/0275369 A1 * | 8/2020 | Foster | H04W 52/0225 |
| 2021/0029643 A1 * | 1/2021 | Stauffer | H04W 76/27 |
| 2021/0058856 A1 * | 2/2021 | Qi | H04W 76/14 |
| 2022/0417852 A1 * | 12/2022 | Sjöland | H04B 1/16 |
| 2022/0418025 A1 * | 12/2022 | Kim | H04W 52/28 |
| 2023/0006454 A1 * | 1/2023 | Bacharowski | H02J 7/0047 |

FOREIGN PATENT DOCUMENTS

| WO | 2018009350 | | 1/2018 |
| WO | 2019245641 | A1 | 12/2019 |

* cited by examiner

| Device Class | Operating bands | Maximum EIRP | Maximum EIRP PSD |
|---|---|---|---|
| Standard-Power Access Point (AFC Controlled) | U-NII-5 (5.925-6.425 GHz) U-NII-7 (6.525-6.875 GHz) | 36 dBm | 23 dBm/MHz |
| Client Connected to Standard-Power Access Point | | 30 dBm | 17 dBm/MHz |
| Low-Power Access Point (indoor only) | U-NII-5 (5.925-6.425 GHz) U-NII-6 (6.425-6.525 GHz) U-NII-7 (6.525-6.875 GHz) U-NII-8 (6.875-7.125 GHz) | 30 dBm | 5 dBm/MHz |
| Client Connected to Low-Power Access Point | | 24 dBm | -1 dBm/MHz |
| Very Low Power Device | U-NII-5 (5.925-6.425 GHz) U-NII-6 (6.425-6.525 GHz) U-NII-7 (6.525-6.875 GHz) U-NII-8 (6.875-7.125 GHz) | 4dBm~14dBm (For a 160MHz channel) | -18 dBm/MHz ~-8dBm/MHz |

FIG. 8

METHOD AND APPARATUS FOR MANAGING SIGNAL TRANSMISSION POWER MODE

CROSS REFERENCE TO RELATED APPLICATION(S)

This application is a National Phase entry of PCT Application No. PCT/CN2020/096838, entitled "METHOD AND APPARATUS FOR MANAGING SIGNAL TRANSMIS-SION POWER MODE" and filed on Jun. 18, 2020, which is expressly incorporated by reference herein in its entirety.

BACKGROUND

Technical Field

The present disclosure relates generally to communica-tion systems, and more particularly, to managing a signal transmission power mode of a user equipment (UE).

Introduction

Wireless communication systems are widely deployed to provide various telecommunication services such as tele-phony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division mul-tiple access (FDMA) systems, orthogonal frequency divi-sion multiple access (OFDMA) systems, single-carrier fre-quency division multiple access (SC-FDMA) systems, and time division synchronous code division multiple access (TD-SCDMA) systems.

These multiple access technologies have been adopted in various telecommunication standards to provide a common protocol that enables different wireless devices to commu-nicate on a municipal, national, regional, and even global level. An example telecommunication standard is 5G New Radio (NR). 5G NR is part of a continuous mobile broad-band evolution promulgated by Third Generation Partner-ship Project (3GPP) to meet new requirements associated with latency, reliability, security, scalability (e.g., with Inter-net of Things (IoT)), and other requirements. 5G NR includes services associated with enhanced mobile broad-band (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The appa-ratus of wireless communication is a UE. When the UE is out of coverage of any base station the UE may operate in a very low-power (VLP) mode and set a signal transmission power at a first power level. The UE may detect and connect to a base station. Here, connecting to the detected base station may include one of establishing a radio resource control (RRC) connected mode with the base station, or establishing an RRC idle mode with the base station and monitoring a radio link measurement (RLM) reference sig-nal (RS) of the base station. The UE may switch the power mode of UE based on a power mode of the base station to which the UE is connected and switch the signal transmis-sion power from the first power level to a second power level greater than the first power level. The second power level may be determined based on a system information block (SIB) transmitted from the base station. The UE may switch the power mode of the UE from the VLP mode to a standard-power (SP) mode in response to the base station operating in the SP mode, and to a low-power indoor (LPI) mode in response to the base station operating in the LPI mode. When the UE detects at least two base stations, the UE may select the base station from the at least two base stations detected based on a condition and connect to the base station selected from the at least two detected base stations.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is a chart showing maximum equivalent isotropic radiated power (EIRP) and power spectral density (PSD).

DETAILED DESCRIPTION

Figure 1:
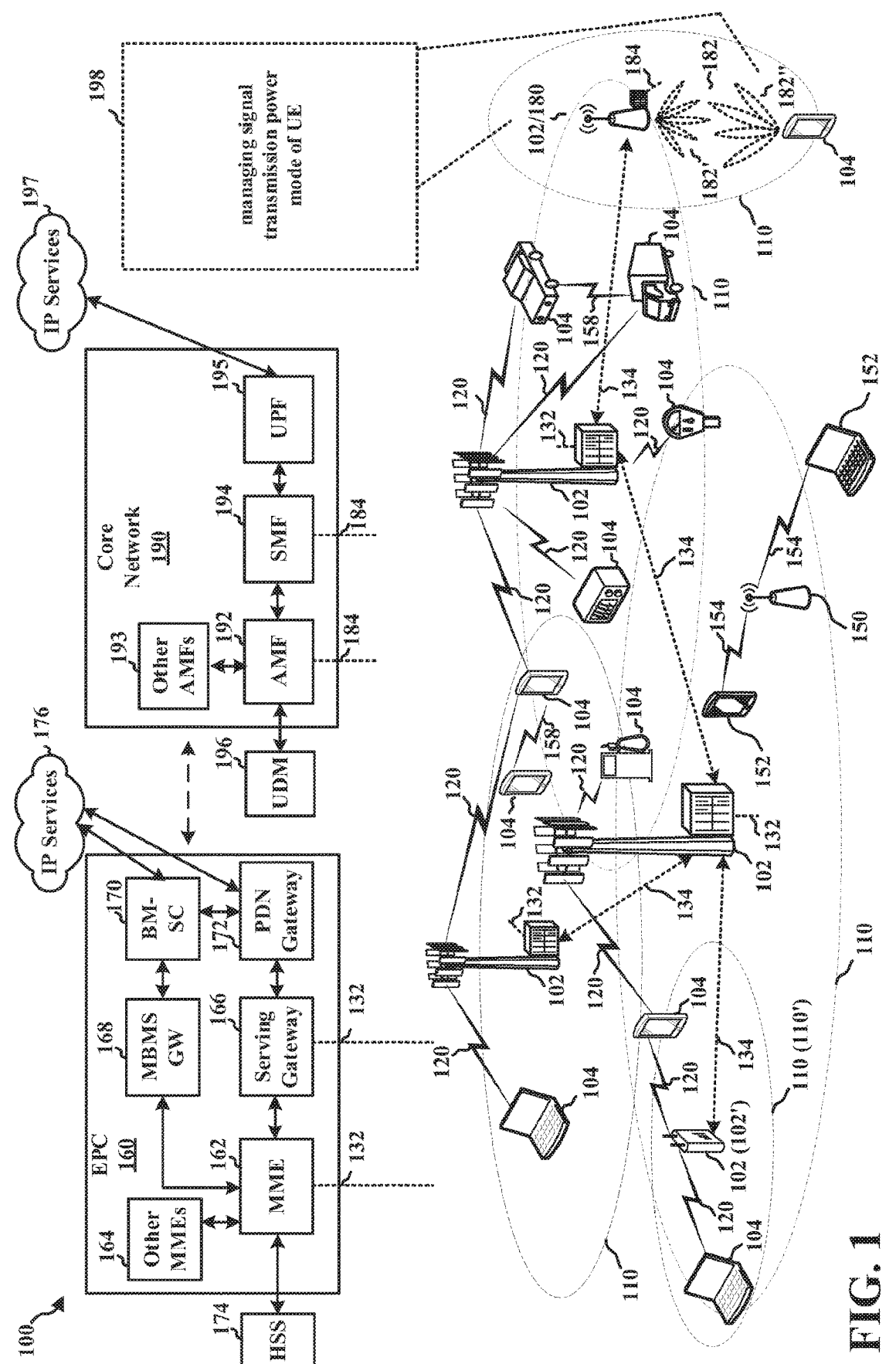
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and macrocells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y Wiz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to manage a signal transmission power mode of the UE (198). Although the following description may be focused on 5G NR, the concepts described herein may be applicable to other similar areas, such as LTE, LTE-A, CDMA, GSM, and other wireless technologies.

Figures 2A, 2B, 2C, 2D:
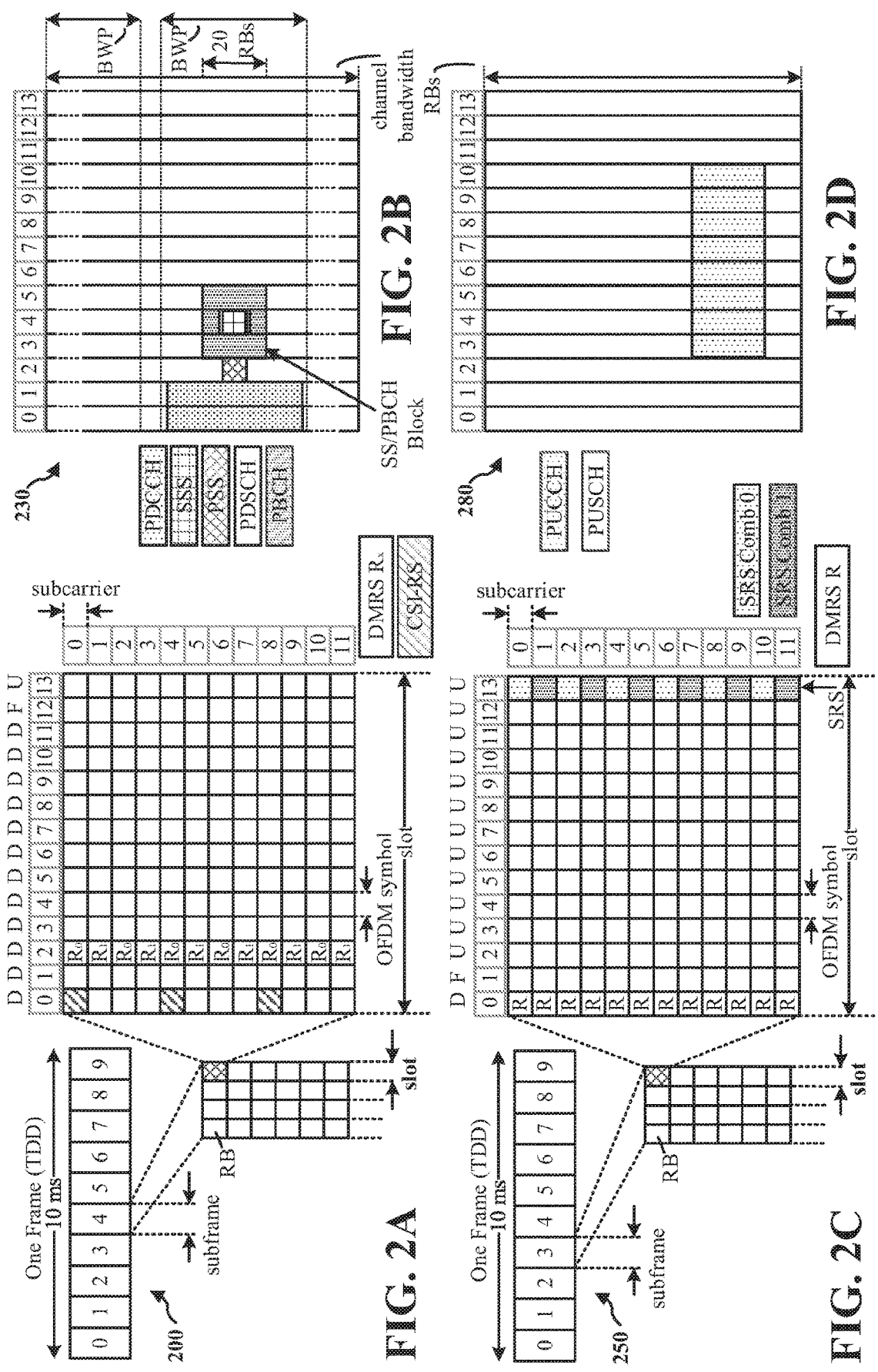
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-TDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARM) ACK/NACK feedback. The PUSCH carries data, and may additionally be used to carry a buffer status report (BSR), a power headroom report (PHR), and/or UCI.

Figure 3:
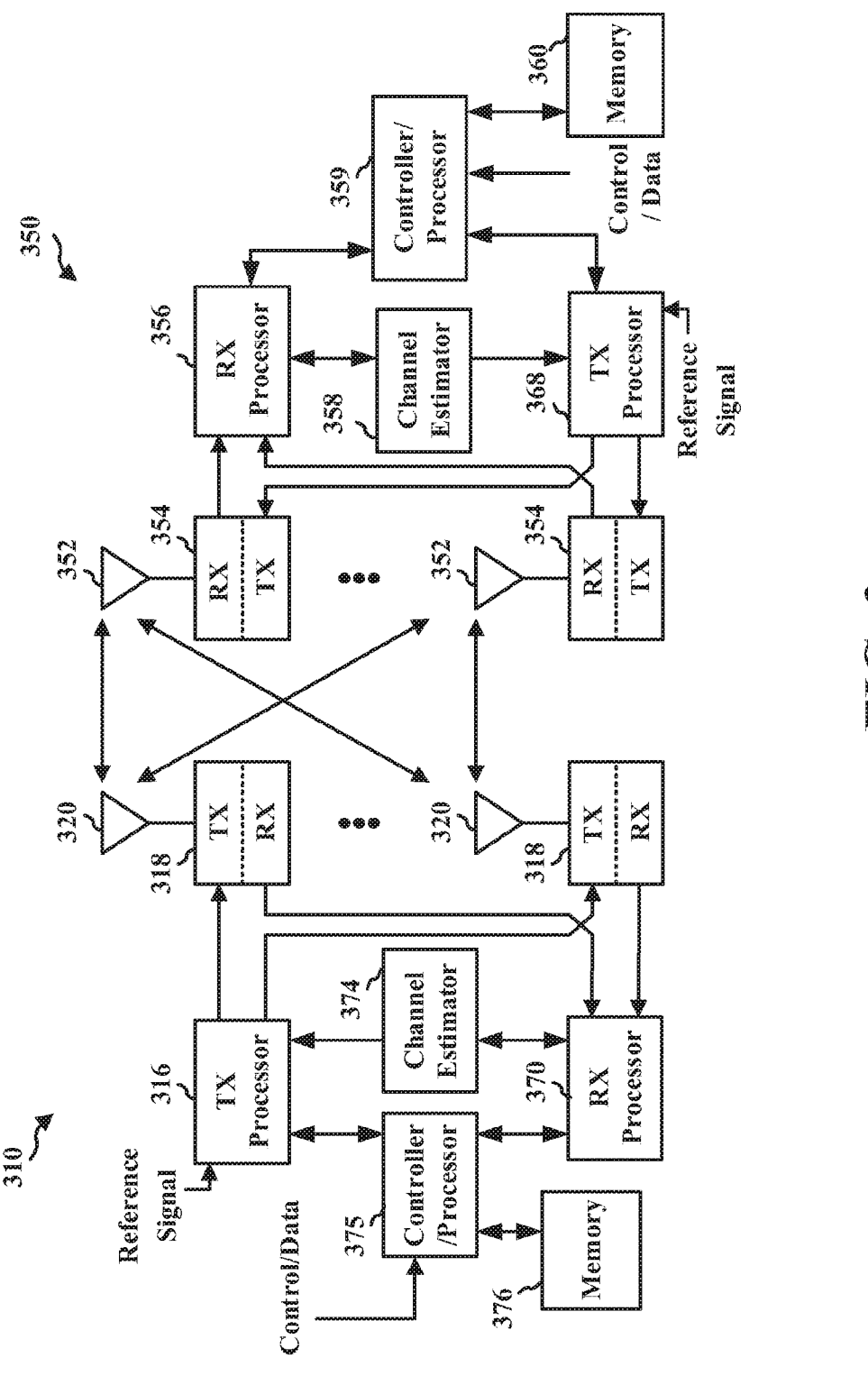
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC)

coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

In some aspects, the UE and the base station may operate at certain signal transmission powers. That is, the UE and the base station may be in preset power modes, and the UE and the base stations operated in each of the preset power modes may operate at a corresponding signal transmission power for each power mode. Each of the signal transmission powers may be represented by an equivalent isotropic radiated power (EIRP) and a power spectral density (PSD) of the signal transmission. For example, the UE and the base station operating in a 6 GHz band may operate at the following signal transmission powers as provided the table 1 below.

TABLE 1

| Transmission power modes of the UE and the base station | | | |
| --- | --- | --- | --- |
| Device Class | Operating bands | Maximum EIRP | Maximum EIRP PSD |
| Standard-Power (SP) base station (AFC Controlled) | U-NII-5 (5.925-6.425 GHz) U-NII-7 (6.525-6.875 GHz) | 36 dBm | 23 dBm/MHz |
| UE Connected to SP base station | | 30 dBm | 17 dBm/MHz |
| Low-Power Indoor (LPI) | U-NII-5 (5.925-6.425 GHz) | 30 dBm | 5 dBm/MHz |

12

TABLE 1-continued

| Transmission power modes of the UE and the base station | | | |
| --- | --- | --- | --- |
| Device Class | Operating bands | Maximum EIRP | Maximum EIRP PSD |
| base station (indoor only) UE Connected to LPI base station | U-NII-6 (6.425-6.525 GHz) U-NII-7 (6.525-6.875 GHz) U-NII-8 (6.875-7.125 GHz) | 24 dBm | -1 dBm/MHz |
| Very Low Power (VLP) Device | U-NII-5 (5.925-6.425 GHz) U-NII-6 (6.425-6.525 GHz) U-NII-7 (6.525-6.875 GHz) U-NII-8 (6.875-7.125 GHz) | 4 dBm~14 dBm (For a 160 MHz channel) | -18 dBm/ MHz~-8 dBm/MHz |

As illustrated in Table 1, the UE and the base station may operate in one of the three transmission power modes. First, the UE and the base station may operate in the standard power (SP) mode. In the SP mode, the base station may contact an Automated frequency coordination (AFC) to obtain, for each frequency, the maximum power spectral density (PSD) and the maximum equivalent isotropic radiated power (EIRP). That is, the base station in SP mode may receive the maximum PSD and the maximum EIRP for each frequency, and determine the signal transmission power based on the maximum PSD and the maximum EIRP received from the AFC. For example, for the base station operating at 6 GHz band, the maximum PSD of the signal transmission power of the base station in the SP mode may be about 23 dBm/MHz, and/or the maximum EIRP of the signal transmission power of the base station in the SP mode may be about 36 dBm.

The UE connected to the base station in the SP mode may operate in the SP mode. The UE may be configured to operate under the control of the SP base station. Here, the UE in the SP mode may determine a signal transmission power 6 dBm lower than the maximum PSD and the maximum EIRP of the signal transmission power allowed for the base station in the SP mode. For example, for the UE operating at 6 GHz band, the maximum PSD of the signal transmission power of the UE in the SP mode may be about 17 dBm/MHz, and/or the maximum EIRP of the signal transmission power of the UE in the SP mode may be about 30 dBm.

Second, the UE and the base station may operate in a low-power indoor (LPI) mode. The base station may operate in the LPI mode without contacting the AFC. For example, for the base station operating in a 6 GHz band, the maximum PSD of the signal transmission power of the base station in the LPI mode may be about 5 dBm/MHz, and/or the maximum EIRP of the signal transmission power of the base station in the LPI mode may be about 30 dBm.

The UE connected to the base station in the LPI mode may operate in the LPI mode. The UE may be configured to operate under the control of the LPI base station. The UE in the LPI mode may set the signal transmission power at 6 dBm lower than the maximum PSD and 6 dBm lower than the maximum EIRP of the signal transmission power allowed for the base station in the LPI mode. For example, for the UE operating in a 6 GHz band, the maximum PSD of the signal transmission power of the UE in the LPI mode may be about -1 dBm/MHz, and/or the maximum EIRP of the signal transmission power of the UE in the LPI mode may be about 24 dBm. The base station and the associated UEs in the LPI mode may be employed for indoor only, and may employ a contention-based protocol (CBP).

Also, the UE may operate in a very low-power (VLP) mode. The UE in the VLP mode may be deployed indoor and/or outdoor. The UE may also operate across a broader operating bandwidth without using the AFC. For example, the UE operating in one of the 6 GHz bands may operate across the entirety of the 6 GHz bandwidth, without contacting the AFC. The UE in the VLP mode may have a limited signal transmission power. For example, for the UE in the VLP mode, the maximum PSD of the signal transmission power of the UE in the VLP mode may be equal to or greater than −18 dBm/MHz and equal to or less than −8 dBm/MHz, and/or the maximum EIRP of the signal transmission power of the UE in the VLP mode may be equal to or greater than 4 dBm and equal to or less than 14 dBm for a 160 MHz channel.

In some aspects, the UE may have a low transmit power in the VLP mode. That is, the UE operating in the VLP mode may be limited to a very low transmit power. In order to increase the performance of the UE, the transmit power of the UE may be increased while reducing the possibility of harmful interference to incumbent or neighboring 6 GHz band equipment. That is, simply increasing the transmission power of the UE operating in the VLP mode may create interference with the signal transmission from the neighboring user equipment.

If the UE can connect to a SP mode base station or a LPI mode base station, then the UE may determine that the UE is within the coverage area of the base station. Accordingly, the UE may use or increase the transmission power to the power limitation allowed for the SP mode or the LPI mode to increase the performance of the signal transmission.

In certain aspects, various approaches may be utilized to support the power determination. That is, the UE may switch the signal transmission power and the power mode of the UE based on different conditions. For example, if the UE determines that the UE is not connected to a base station, the UE may follow the VLP power limitations. For example, the power limitations may be 4 dBm ~14 dBm EIRP for 160 MHz and/or −18 dBm/MHz ~−8 dBm/MHz for PSD. If the UE is connected to a SP mode base station, the UE may use the UE power limitation of the SP mode, and follow a configuration sent by the base station. If the UE is connected to a LPI base station, the UE will use the UE power limitation of the LPI mode.

Figure 4:
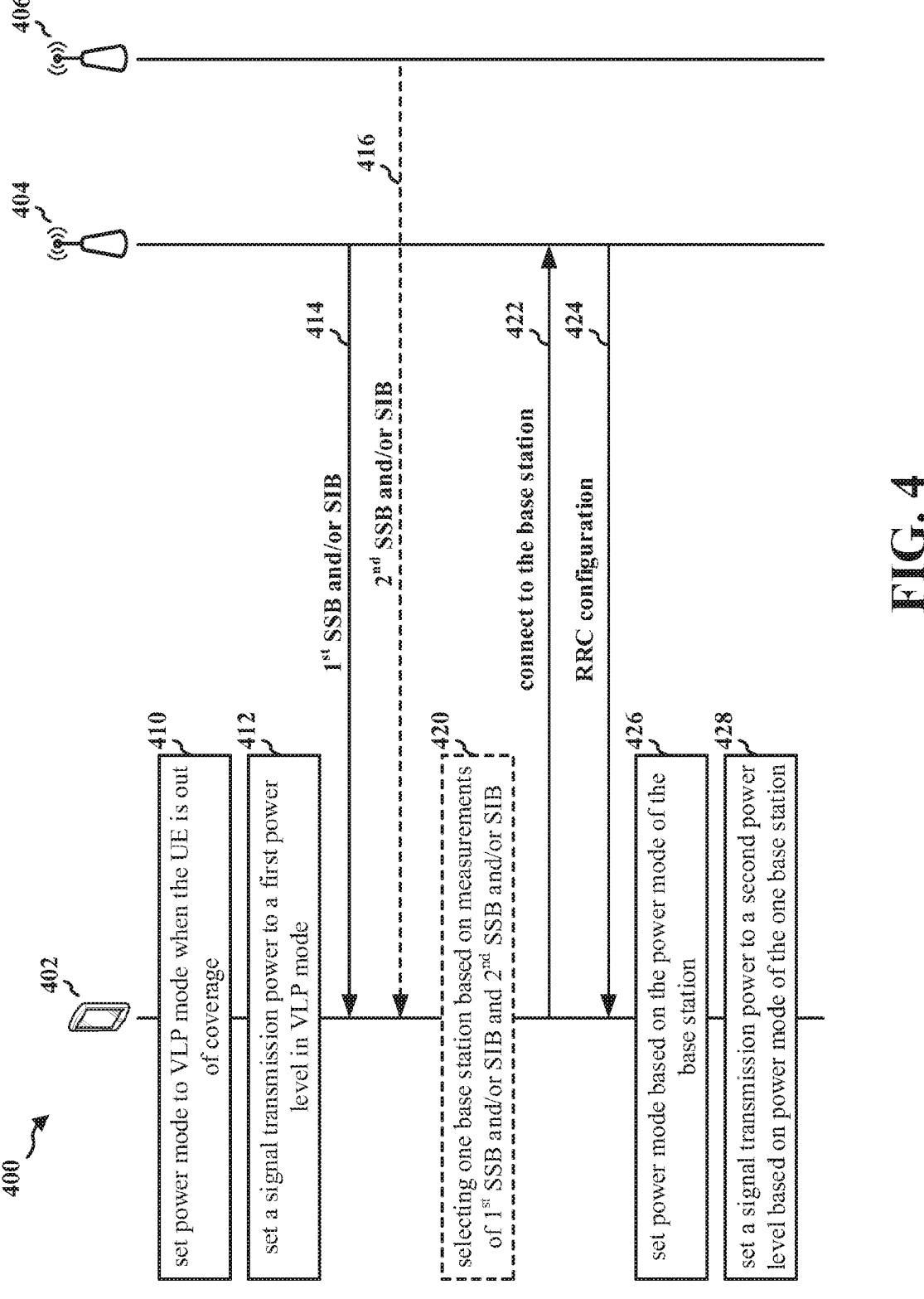
FIG. 4 is a call flow diagram of a method of wireless communication.

FIG. 4 is a call flow diagram 400 of a method of wireless communication between a UE 402 and a first base station 404 and a second base station 406. At 410, the UE 402 may set the power mode of the UE 402 to the VLP mode when the UE 402 is out of coverage. The UE 402 in the VLP mode may operate under the VLP power limitation.

The UE 402 may determine that the UE 402 is out of coverage of a base station when the UE 402 determines that the radio link with the base station is broken and/or determines that the UE 402 cannot detect a base station to establish a radio link with. For example, The UE 402 may determine that the UE 402 is out of a coverage of the base station when the UE 402 determines that a reference signal received power (RSRP) or a reference signal received quality (RSRQ) of a reference signal from a base station is too low (or under a threshold value). The UE 402 may also determine that the UE 402 is out of the coverage of the base station when the UE 402 fails to decode the PDCCH or the PDSCH.

Accordingly, at 412, the UE 402, in VLP mode, may set the signal transmission power at a first power level. For example, the maximum PSD of the signal transmission power of the UE 402 in the VLP mode may be equal to or greater than −18 dBm/MHz and equal to or less than −8 dBm/MHz, and/or the maximum EIRP of the signal transmission power of the UE 402 in the VLP mode may be equal to or greater than 4 dBm and equal to or less than 14 dBm for a 160 MHz channel. The UE 402 may keep the maximum transmission power (Pmax) unchanged after power selection.

At 414, the UE 402 may detect first synchronization signal block (SSB) and/or system information block (SIB) from the first base station 404. Upon detecting the first SSB and/or SIB from the first base station 404, the UE 402 at 422 may send a connection request to establish a connection with the first base station 404. Here, establishing a connection with the first base station may refer to the UE 402 entering the RRC connected mode with the first base station 404, or remaining in the RRC idle mode with the first base station 404, and monitoring the first radio link measurement (RLM) reference signal (RS) of the first base station 404.

Upon successfully connecting to the first base station 404, at 424, the UE 402 may receive a RRC configuration from the first base station 404. At 426, the UE then may set the power mode of the UE 402 based on information from the SIB received from the first base station. For example, if the first base station 404 to which the UE 402 is connected is in the SP mode, the power mode of the UE 402 may be switched to the SP mode, based on the power mode of the first base station 404. If the first base station 404 to which the UE 402 is connected is in the LPI mode, the power mode of the UE 402 may be switched to the LPI mode, based on the power mode of the first base station 404.

At 428, The UE 402 may also set a signal transmission power to a second power level based on power mode of the first base station. That is, the UE 402 may determine the power mode of the UE 402 and set the signal transmission power at the second power level based on the power mode of the UE 402 and the SIB received from the first base station 404. When the UE 402 is in the SP mode or the LPI mode, the Pmax, the PSD, the EIRP of the UE 402 may be determined based on the SIB transmitted from the first base station 404. The UE 402 may keep the Pmax for the SP mode or the LPI mode unchanged after the selection of the power mode. The first base station 404 may directly control the transmit power, the PSD, the EIRP of the UE 402.

At 416, the UE 402 may detect a second base station, the first base station 404 and a second base station 406. That is, the UE 402 may receive the first SSB and/or SIB 414 from the first base station 404 and a second SSB and/or SIB 416 from the second base station 406. At 420, the UE 402 may select one of the two base stations based on measurements of the first SSB and/or SIB 414 and the second SSB and/or SIB 416.

The UE 402 may select the base station based on conditions and the measurements of the first SSB and/or SIB 414 received from the first base station 404 and measurements of the second SSB and/or SIB 416 received from the second base station 406. The conditions and the measurements of the first and second RLM RSs 414 and 416 may include, but are not limited to, a reference signal received power (RSRP), a reference signal received quality (RSRQ), a maximum transmission power (Pmax), or a size of a bandwidth signaling received from the first base station 404 and the second base station 406.

In one aspect, the UE 402 may select the base station to establish a connection with that has a better channel quality. The UE 402 may obtain the channel quality from the RSRP and/or the RSRQ measurements of the first SSB 414 received from the first base station 404 and the second SSB 416 received from the second base station 406. That is, the UE 402 may select the base station from the first base station 404 and the second base station 406 in response to determining which of the first SSB 414 and the second SSB 416 has a better RSRP and/or the RSRQ measurement. The UE 402 may reduce the power required to transmit a signal to the base station by selecting the base station to establish a connection with as the base station having a better channel quality.

In another aspect, the UE 402 may select a base station to establish a connection with that has a greater Pmax value. The UE 402 selecting to connect to the base station that has a greater Pmax value may have an improved performance. The UE 402 may also select the base station that has a greater bandwidth size for an increased performance in terms of the data transmission rate that the UE 402 may use to transmit data to the base station. The UE 402 may also select the base station based on a combination of the above parameters.

Figure 5:
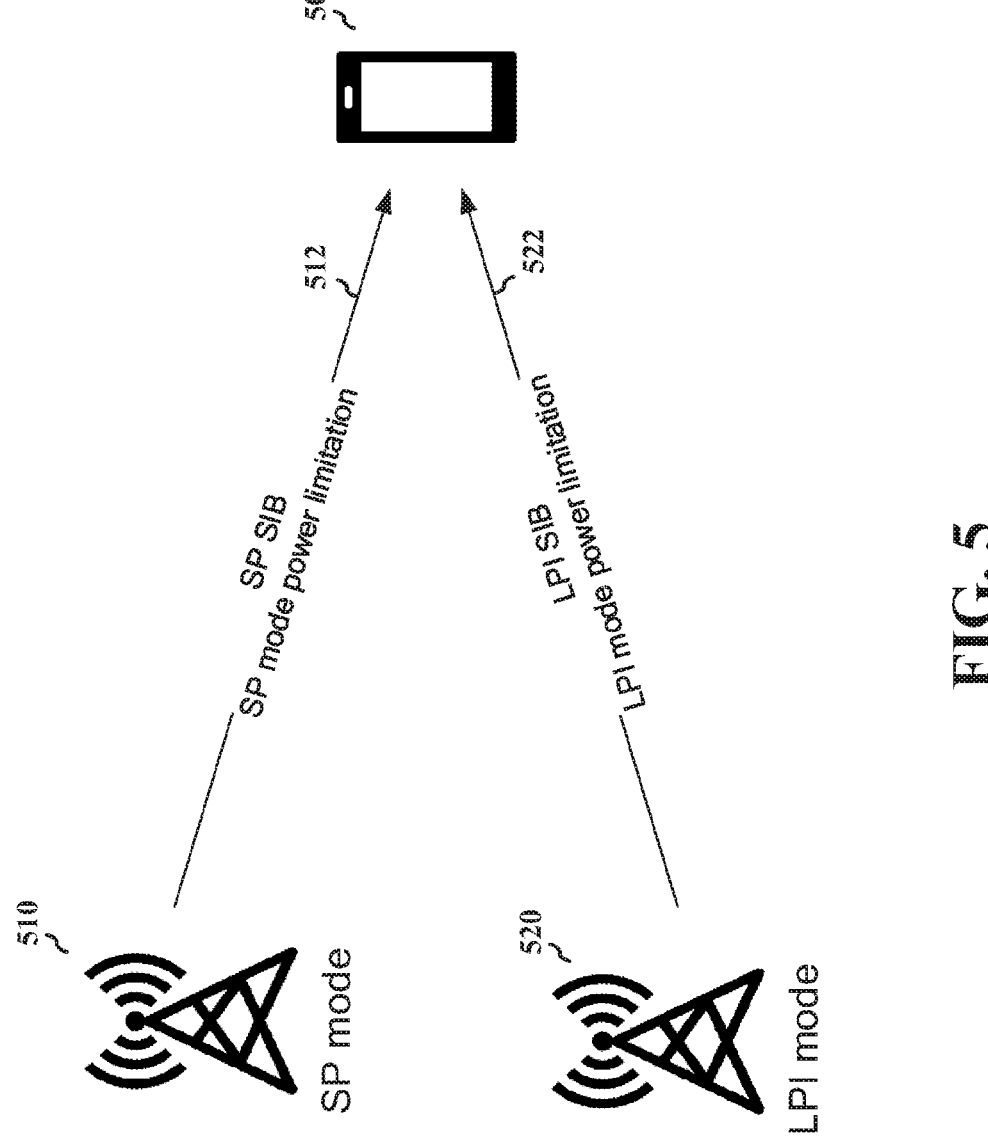
FIG. 5 is a diagram illustrating a network of base stations and a UE.

FIG. 5 is a diagram 500 illustrating an example network of base stations and a UE. The UE 502 may detect an SP mode base station 510 and/or an LPI mode base station 520. If the UE 502 is connected to the SP mode base station 510, the SP mode base station 510 may directly control the transmit power, the PSD, and/or the EIRP of the UE 502. If the UE 502 is connected to the LPI mode base station 520, the LPI mode base station 520 may directly control the transmit power, the PSD, and/or the EIRP of the UE 502. When the UE is connected to the SP mode base station 510, the UE may receive a SP SIB and a SP mode power limitation 512 from the SP mode base station 510. When the UE is connected to the LPI mode base station 520, the UE may receive the SIB from the SP mode base station 510 and the SP mode power limitation 522 from the LPI mode base station 520.

Figure 6:
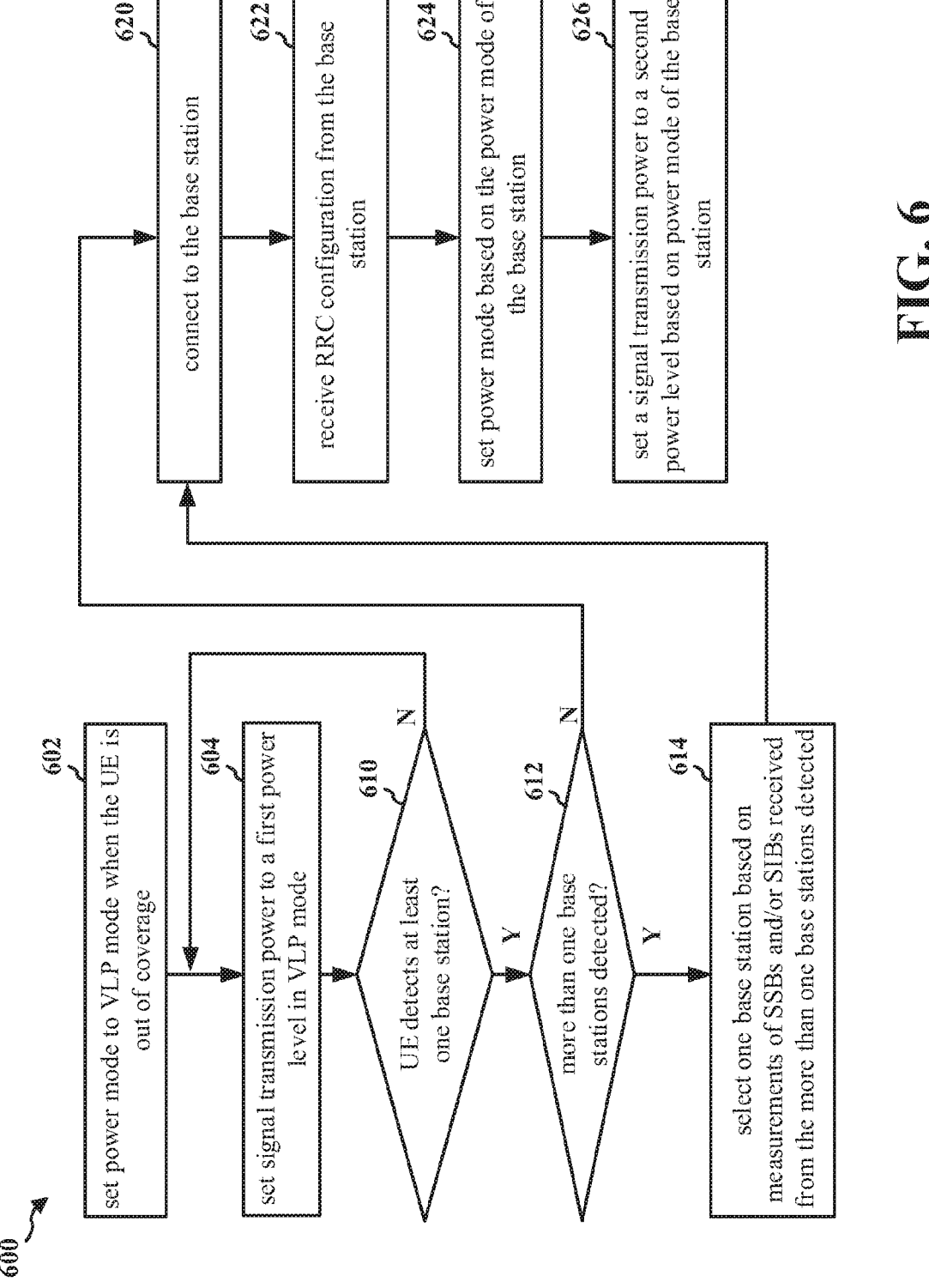
FIG. 6 is a flowchart of a method of wireless communi-cation.

FIG. 6 is a flowchart 600 of a method of wireless communication. The method may be performed by a UE (e.g., the UE 104, 402, and 502; the apparatus 702). At 602, the UE may set the UE power mode to VLP mode when the UE is out of coverage. For example, 602 may be performed by a power mode component 740.

At 604, the UE may set signal transmission power at a first power level when in VLP mode. For example, 604 may be performed by a signal transmission power component 742.

At 610, the UE may determine whether the UE detected at least one base station. For example, 610 may be performed by a base station management component 744.

At 612, the UE may determine whether more than one base station was detected. For example, 612 may be performed by the base station management component 744.

At 614, when more than one base station is detected, the UE may select one base station from the detected base stations based on measurements of SSBs and/or SIBs received from the base stations detected. For example, 614 may be performed by the base station management component 744.

At 620, the UE may connect to the base station (either the detected base station or the selected base station). For example, 610 may be performed by an RRC component 746.

At 622, the UE may receive an RRC configuration from the base station and set the power mode of the base station based on information from the SIB. For example, 622 may be performed by the RRC component 746.

At 624, the UE may set the power mode based on the power mode of the base station. For example, 624 may be performed by the power component 740.

Finally, at 626, the UE may set a signal transmission power to a second power level based on power mode of the base station. For example, 606 may be performed by a signal transmission power component 742.

Figure 7:
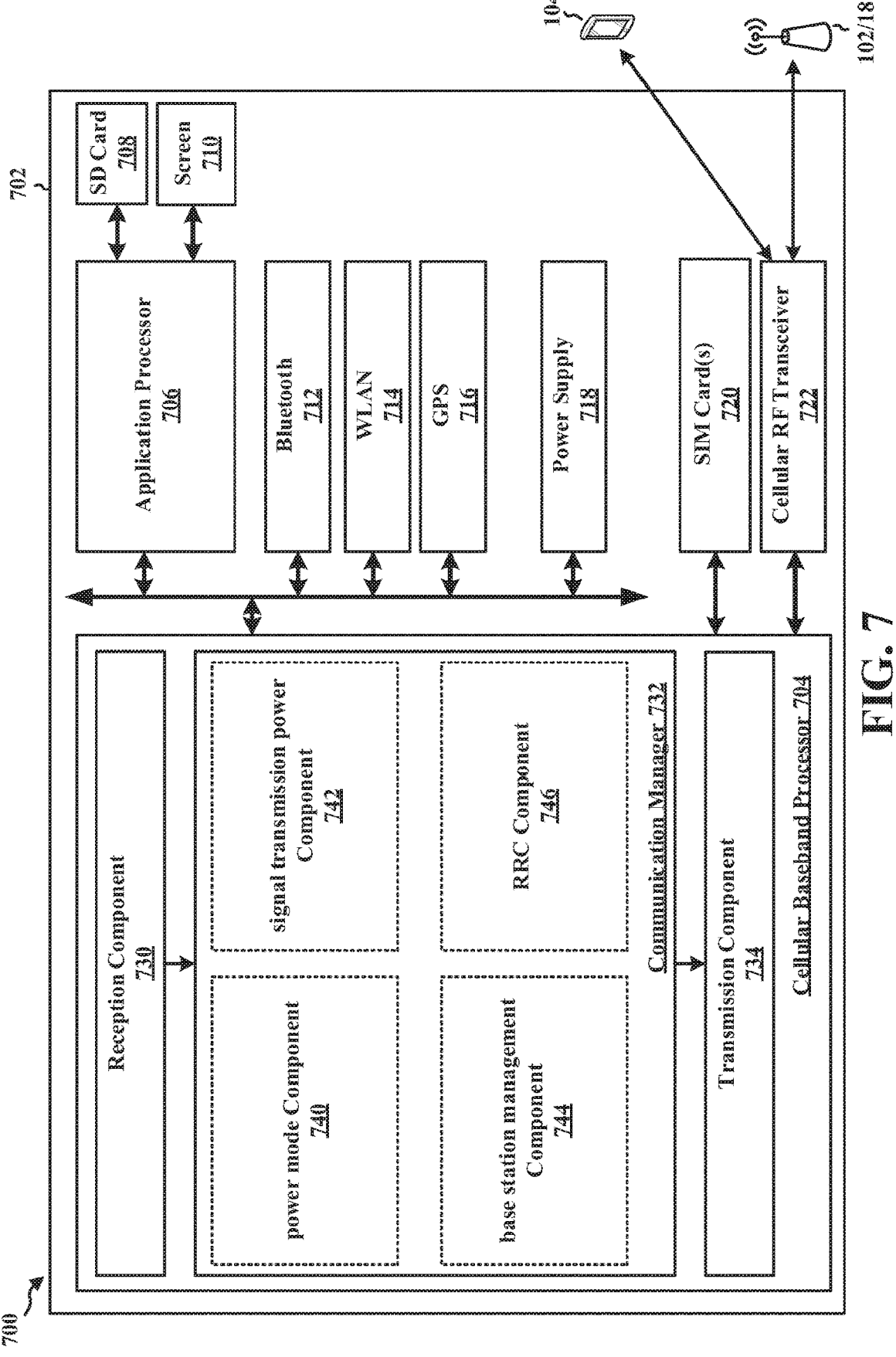
FIG. 7 is a diagram illustrating an example hardware implementation of an apparatus.
Figure 9:
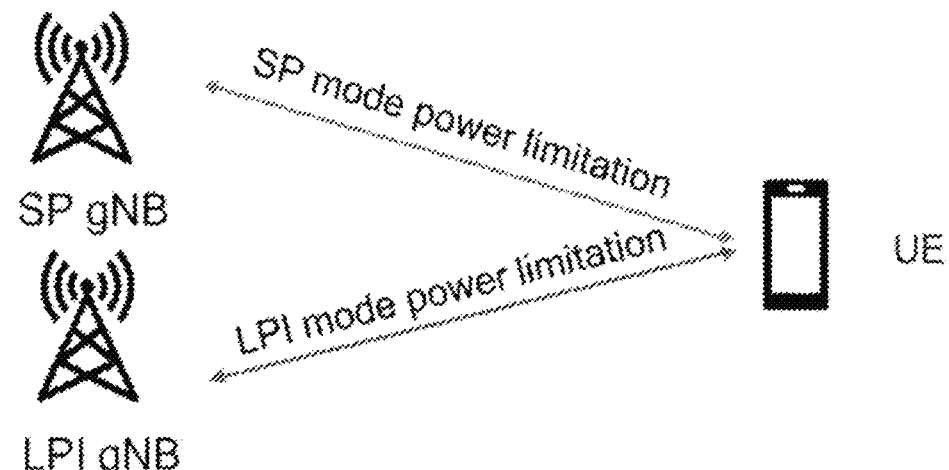
FIG. 9 is a diagram illustrating cases of a single gNB and a UE.
Figure 10:
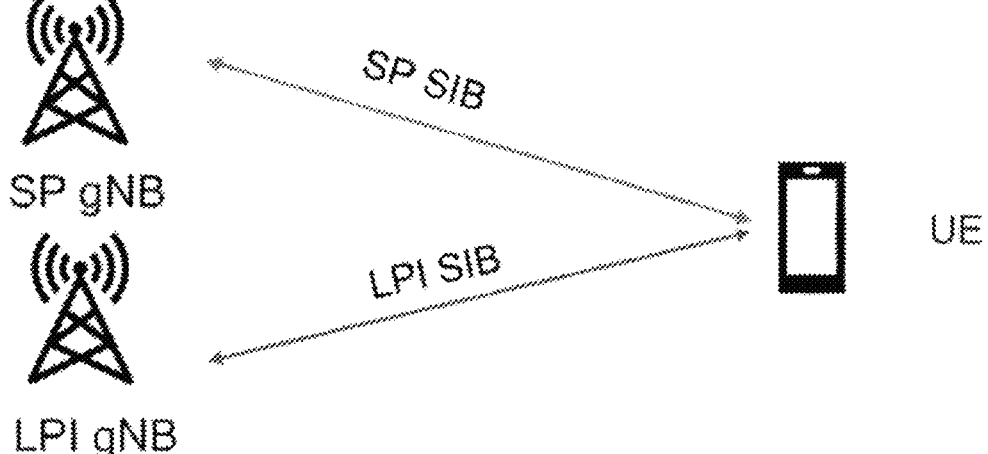
FIG. 10 is a diagram illustrating an example of multiple gNBs and a UE.

FIG. 7 is a diagram 700 illustrating an example of a hardware implementation for an apparatus 702. The apparatus 702 may be a UE that includes a cellular baseband processor 704 (also referred to as a modem) coupled to a cellular RF transceiver 722 and one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, and a power supply 718. The cellular baseband processor 704 communicates through the cellular RF transceiver 722 with the UE 104 and/or BS 102/180. The cellular baseband processor 704 may include a computer-readable medium/memory. The computer-readable medium/memory may be non-transitory. The cellular baseband processor 704 is responsible for general processing, including the execution of software stored on the computer-readable medium/memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the baseband processor 704, and in another configuration, the apparatus 702 may be the entire UE (e.g., see 350 of FIG. 3) and include the aforediscussed additional modules of the apparatus 702.

The communication manager 732 includes a power mode component 740 that is configured to set the power mode to VLP mode when the UE is out of coverage and set the power mode based on the power mode of the base station when the UE is connected to the base station, e.g., as described in connection with 602 and 624. The communication manager 732 further includes a signal transmission power component 742 that is configured to set signal transmission power at a first power level when the UE is in VLP mode or set the power mode based on the power mode of the base station, e.g., as described in connection with 604 and 626. The communication manager 732 further includes a base station management component 744 that is configured to determine whether the UE detected at least one base station, determine whether more than one base station was detected, select one base station, when more than one base station is detected, based on measurements of RML RSs received from the base stations detected, and receive a SIB from the base station e.g., as described in connection with 610, 612, and 614. The communication manager 732 further includes an RRC component 746 that is configured to connect to the base station and receive RRC configuration from the base station, e.g., as described in connection with 620 and 622. The components 740, 742, 744, and 746 may be configured to communicate with each other.

The apparatus may include additional components that perform each of the operations (or blocks) of FIGS. 4, 5, 6, and 7. As such, each block in the aforementioned FIGS. 4, 5, 6, and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the cellular baseband processor 704, includes means for setting a signal transmission power at a first power level based on the UE being in the VLP mode, means for detecting a base station and connecting the UE in VLP mode to the detected base station, means for switching the power mode of the UE based on a power mode of the base station connected by the UE, means for switching the signal transmission power from the first power level to a second power level greater than the first power level in response to connecting the UE to the base station, means for detecting at least two base stations, means for selecting the base station from the two base stations detected based on at least one of the RSRP, the RSRQ, the Pmax, or a size of a bandwidth signaling received from the two base stations, and means for connecting to the base station selected from the two base stations detected.

The aforementioned means may be one or more of the aforementioned components of the apparatus 702 configured to perform the functions recited by the aforementioned means. As described supra, the apparatus 702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Referring again to FIGS. 4, 5, 6, and 7, the apparatus of wireless communication is a UE. The UE out of coverage of any base station may operate in a VLP mode and set a signal transmission power at a first power level. The UE may detect and connect to a base station. Here, connecting to the detected base station may include one of establishing a RRC connected mode with the base station, or establishing an RRC idle mode with the base station and monitoring an RLM RS of the base station. The UE may switch the power mode of UE based on a power mode of the base station connected by the UE and switch the signal transmission power from the first power level to the second power level greater than the first power level. The second power level may be determined based on a SIB transmitted from the base station. The UE may switch the power mode of the UE from the VLP mode to an SP mode in response to the base station in the SP mode, and to an LPI mode in response to the base station in the LPI mode. When the UE detects at least two base stations, the UE may select the base station from the two base stations detected based on a condition and connect to the base station selected from the two detected base stations. Accordingly, the UE may have a reduced power consumption when the UE is out of coverage of any base station, and have improved performance when detecting the base station and connecting to the base station by switching the power mode of the UE based on the power mode of the connected base station and switch the signal transmission power to an increased power level.

Further disclosure is included in the Appendix.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

What is claimed is:

1. A method of wireless communication of a user equipment (UE), comprising:

setting a signal transmission power to a first power level when a power mode of the UE is a very low-power (VLP) mode, wherein the first power level comprises an equivalent isotropic radiated power (EIRP) of equal to or greater than 4 dBm and equal to or smaller than 14 dBm for a 160 MHz channel, or a power spectral density (PSD) of equal to or greater than −18 dBm/MHz and equal to or smaller than −8 dBm/MHz;

detecting a base station and connecting the UE in VLP mode to the detected base station;

switching the power mode of the UE based on a power mode of the base station; and switching the signal transmission power from the first power level to a second power level greater than the first power level in response to connecting the UE to the base station.

2. The method of claim 1, wherein the UE is in the VLP mode when the UE is out of coverage of any base station.

3. The method of claim 1, wherein the connecting to the detected base station comprises one of establishing a radio resource control (RRC) connected mode with the base station, or establishing an RRC idle mode with the base station and monitoring a radio link measurement (RLM) reference signal (RS) of the base station while in the RRC idle mode.

4. The method of claim 1, wherein the second power level is determined based on a system information block (SIB) transmitted from the base station.

5. The method of claim 4, wherein the switching the power mode comprises switching the power mode of the UE from the VLP mode to a standard-power (SP) mode in response to the base station operation in the SP mode.

6. The method of claim 4, wherein the switching the signal transmission power comprises switching the power mode of the UE from the VLP mode to a low-power indoor (LPI) mode in response to the base station operating in the LPI mode.

7. The method of claim 1, wherein the detecting the base station and connecting to the base station comprises:

detecting at least two base stations;

selecting the base station from the at least two base stations detected based on at least one of a reference signal received power (RSRP), a reference signal received quality (RSRQ), a maximum transmission power (Pmax), or a size of a bandwidth signaling received from each of the at least two base stations; and connecting to the base station selected from the two detected base stations.

8. An apparatus for wireless communication of a user equipment (UE), comprising:

a memory; and at least one processor coupled to the memory and configured to:

set a signal transmission power to a first power level when a power mode of the UE is a very low-power (VLP) mode, wherein the first power level comprises an equivalent isotropic radiated power (EIRP) of equal to or greater than 4 dBm and equal to or smaller than 14 dBm for a 160 MHz channel, or a power spectral density (PSD) of equal to or greater than −18 dBm/MHz and equal to or smaller than −8 dBm/MHz;

detect a base station and connect the UE in VLP mode to the detected base station;

switch the power mode of the UE based on a power mode of the base station; and

switch the signal transmission power from the first power level to a second power level greater than the first power level in response to connecting the UE to the base station.

9. The apparatus of claim 8, wherein the UE is in the VLP mode when the UE is out of coverage of any base station.

10. The apparatus of claim 8, wherein the at least one processor is configured to connect to the detected base station by establishing a radio resource control (RRC) connected mode with the base station, or establishing an RRC idle mode with the base station and monitoring a radio link measurement (RLM) reference signal (RS) of the base station while in the RRC idle mode.

11. The apparatus of claim 8, wherein the second power level is determined based on a system information block (SIB) transmitted from the base station.

12. The apparatus of claim 11, wherein the at least one processor is configured to switch the power mode by switching the power mode of the UE from the VLP mode to a standard-power (SP) mode in response to the base station operating in the SP mode.

13. The apparatus of claim 11, wherein the at least one processor is configured to switch the signal transmission power by switching the power mode of the UE from the VLP mode to a low-power indoor (LPI) mode in response to the base station operating in the LPI mode.

14. The apparatus of claim 8, wherein the at least one processor is further configured to detect the base station and connect to the base station by:

detecting at least two base stations;

selecting the base station from the at least two base stations detected based on at least one of a reference signal received power (RSRP), a reference signal received quality (RSRQ), a maximum transmission power (Pmax), or a size of a bandwidth signaling received from each of the at least two base stations; and connecting to the base station selected from the two base stations detected.

15. An apparatus for wireless communication of a user equipment (UE), comprising:

means for setting a signal transmission power to a first power level when a power mode of the UE is a very low-power (VLP) mode, wherein the first power level comprises an equivalent isotropic radiated power (EIRP) of equal to or greater than 4 dBm and equal to or smaller than 14 dBm for a 160 MHz channel, or a power spectral density (PSD) of equal to or greater than −18 dBm/MHz and equal to or smaller than −8 dBm/MHz;

means for detecting a base station and connecting the UE in VLP mode to the detected base station;

means for switching the power mode of the UE based on a power mode of the base station; and means for switching the signal transmission power from the first power level to a second power level greater than the first power level in response to connecting the UE to the base station.

16. The apparatus of claim 15, wherein the UE is in the VLP mode when the UE is out of coverage of any base station.

17. The apparatus of claim 15, wherein the connecting to the detected base station comprises to one of establishing a radio resource control (RRC) connected mode with the base station, or establishing an RRC idle mode with the base station and monitoring a radio link measurement (RLM) reference signal (RS) of the base station while in the RRC idle mode.

18. The apparatus of claim 15, wherein the second power level is determined based on a system information block (SIB) transmitted from the base station.

19. The apparatus of claim 18, wherein the switching the power mode comprises switching the power mode of the UE from the VLP mode to a standard-power (SP) mode in response to the base station operating in the SP mode.

20. The apparatus of claim 18, wherein the switching the signal transmission power comprises switching the power mode of the UE from the VLP mode to a low-power indoor (LPI) mode in response to the base station operating in the LPI mode.

21. The apparatus of claim 15, wherein the means for detecting the base station and connecting to the base station comprises:

means for detecting at least two base stations;

means for selecting the base station from the at least two base stations detected based on at least one of a reference signal received power (RSRP), a reference signal received quality (RSRQ), a maximum transmission power (Pmax), or a size of a bandwidth signaling received from each of the at least two base stations; and means for connecting to the base station selected from the two base stations detected.

22. A computer-readable medium storing computer executable code, the code when executed by a processor of a user equipment (UE) cause the processor to:

set a signal transmission power to a first power level when a power mode of the UE is a very low-power (VLP) mode, wherein the first power level comprises an equivalent isotropic radiated power (EIRP) of equal to or greater than 4 dBm and equal to or smaller than 14 dBm for a 160 MHz channel, or a power spectral density (PSD) of equal to or greater than −18 dBm/MHz and equal to or smaller than −8 dBm/MHz;

detect a base station and connect the UE in VLP mode to the detected base station; and switch the power mode of the UE based on a power mode of the base station;

switch the signal transmission power from the first power level to a second power level greater than the first power level in response to connecting the UE to the base station.

* * * * *